United States Patent [19]

Luttgeharm et al.

[11] Patent Number: 5,507,143
[45] Date of Patent: Apr. 16, 1996

[54] CASCADE ASSEMBLY FOR USE IN A THRUST-REVERSING MECHANISM

[75] Inventors: Clint A. Luttgeharm; Marty J. Todd; John M. Welch, all of Wichita, Kans.

[73] Assignee: The Boeing Company, Seattle, Wash.

[21] Appl. No.: 222,317

[22] Filed: Apr. 1, 1994

Related U.S. Application Data

[63] Continuation of Ser. No. 47,104, Apr. 13, 1993.

[51] Int. Cl.⁶ ..................................................... F02K 3/02
[52] U.S. Cl. ...................... 60/226.2; 60/230; 239/265.31
[58] Field of Search ................................. 60/226.2, 230; 239/265.27, 265.29, 265.31, 390; 244/110 B

[56] References Cited

U.S. PATENT DOCUMENTS

| | | |
|---|---|---|
| 1,733,770 | 10/1929 | Andrake . |
| 2,841,954 | 7/1958 | Rainbow ............................ 239/265.31 |
| 3,374,588 | 3/1968 | Alfrey, Jr. et al. ........................ 52/81 |
| 3,512,716 | 5/1970 | Kopp ................................. 239/265.29 |
| 4,067,094 | 1/1978 | Ittner ......................................... 60/230 |
| 4,278,220 | 7/1981 | Johnston ............................ 244/110 B |
| 4,750,807 | 6/1988 | Chamayou dit Felix ............... 350/125 |
| 4,778,110 | 10/1988 | Sankey et al. ..................... 239/265.29 |

FOREIGN PATENT DOCUMENTS

| | | |
|---|---|---|
| 1590144 | 5/1970 | France . |
| 2540536 | 2/1983 | France . |
| 2232114 | 5/1975 | Germany . |
| 187593 | 2/1964 | Sweden . |
| 2221932 | 2/1990 | United Kingdom . |

*Primary Examiner*—Richard A. Bertsch
*Assistant Examiner*—William Wicker
*Attorney, Agent, or Firm*—Christensen, O'Connor, Johnson & Kindness

[57] ABSTRACT

A cascade assembly (14) for use in a thrust reversing mechanism (16) of a jet engine (18) includes at least one group of substantially identically-shaped cascade elements (28) each in the shape of a predefined polygon. The cascade elements (28) are positioned in an array, wherein each cascade element (28) in the group may be interchanged in a location in the array with any other cascade element (28) in the group. In a first preferred embodiment, the predefined polygon is a regular polygon and each cascade element (28) is rotatable in its array position about an axis generally normal to the cascade element (28). The array substantially approximates sections of two intersecting spheres, wherein a central axis of the array is generally coincident with the longitudinal axis of the jet engine (18). The cascade elements (28) are supported in the cascade assembly (14) by a truss structure (30) having a framework defining openings (32) in the shape of the predefined regular polygon for receiving the cascade elements (28).

41 Claims, 8 Drawing Sheets

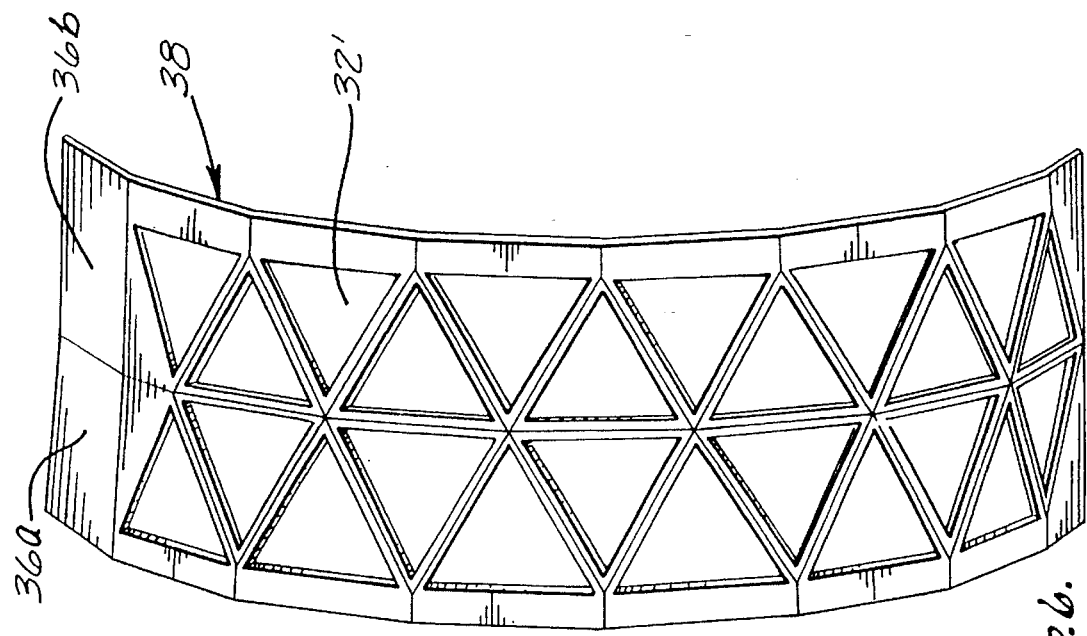
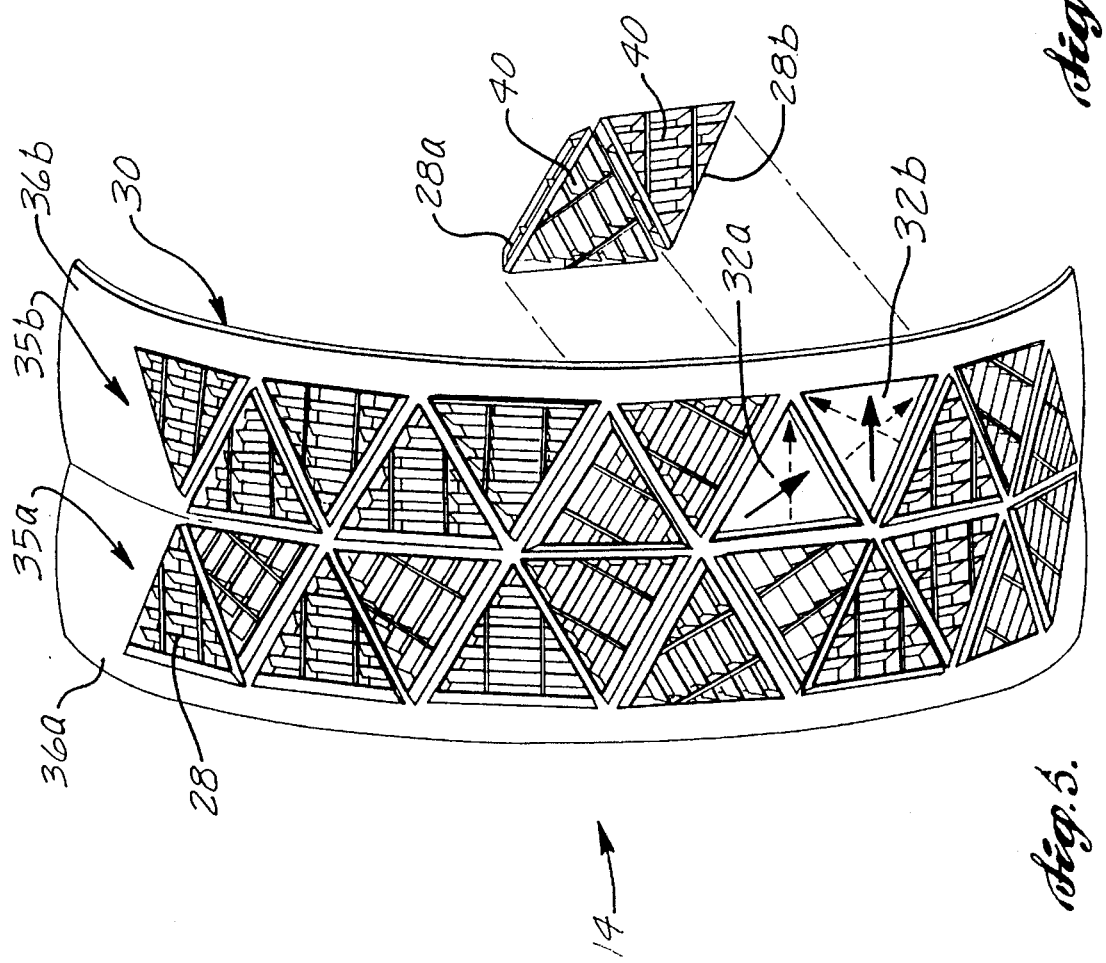

CASCADE ASSEMBLY FOR USE IN A THRUST-REVERSING MECHANISM

This application is a continuation application based on prior copending application Ser. No. 08/047,104, filed on Apr. 13, 1993.

FIELD OF THE INVENTION

The present invention relates to thrust reversers for use on jet engines in aerospace vehicles and, more particularly, to cascade assemblies that direct engine gases forwardly in thrust reverser mechanisms.

BACKGROUND OF THE INVENTION

Thrust reverser mechanisms are commonly used in jet engines to provide additional braking power. Typically, in a thrust reverser mechanism at least a part of the normal flow of gases through the engine is diverted and forced to exit through side openings of the jet engine nacelle, rather than through the rear of the engine. Thus, when the thrust reverser mechanism is in use, gas flowing through the thrust reverser exits the engine generally perpendicular to the direction of normal flow that produces thrust to propel the aerospace vehicle forward. Vanes, alternatively called airfoils, positioned in the side openings, then direct the gas forwardly as it exits the engine nacelle, producing a reverse thrust, or a braking effect. Combinations of these vanes are referred to as cascades.

Known problems with thrust reversers are that the forwardly directed gas impinges upon the wing and fuselage of the aerospace vehicle, interferes with the proper operation of aerospace vehicle control surfaces, and is reingested by the engine. One attempted solution to this problem has been to produce individual cascade elements that not only redirect the gas flow forwardly, but also sideways in a predefined efflux pattern, that is, in a direction substantially tangential to the annular fan duct. Thus, when the thrust reverser is operating, the gas is directed forwardly in a designed efflux pattern that avoids impingement upon the wing, fuselage, and flight control surfaces, and that avoids reingestment by the engine.

The individual cascade elements are shaped as segments of a cylinder or a cone, and assembled concentrically around the centerline of the jet engine to form the completed cascade assembly. FIG. 1 shows a prior art cascade element 10 in the form of a generally rectangular cylindrical segment. Many such similar cascade elements are assembled to form a substantially cylindrically-shaped prior art cascade assembly 12 as shown in FIG. 2. Alternatively, the cascade elements are planar elements that are assembled around the centerline of the engine to substantially approximate a cylinder or cone.

One major problem with the solution attempted above is that many different cascade elements are produced and used in the completed cascade assembly. Typically, prior art cascade assemblies use sixteen or more cascade elements per engine to achieve the desired efflux pattern. In addition, each cascade element in prior art cascade assemblies requires a mirror image element for use on an engine mounted on the opposite side of the aerospace vehicle, doubling the required number of different cascade elements.

The manufacture of these many different cascade elements results in very high production costs. The present invention addresses the above problem by providing a cascade assembly composed of a reduced number of cascade element configurations that are substantially identical and used in many different locations in the cascade assembly. Additionally, in a first preferred embodiment, these cascade elements are supported in a manner which reduces the load carried by the cascade elements.

These design characteristics allow the construction of a lower cost cascade assembly requiring fewer different parts, and the option of construction techniques using lower strength and less expensive materials than have previously been possible. As a result, production costs are significantly reduced.

SUMMARY OF THE INVENTION

The present invention provides a cascade assembly for use in a thrust-reversing mechanism of a jet engine. The cascade assembly includes at least one group of substantially identically-shaped cascade elements, each in the shape of a predefined polygon. The cascade elements are positioned in an array, wherein each cascade element in the group may be interchanged in a location in the array with any other cascade element in the group.

Generally, the purpose of the cascade assembly is to substantially achieve a predefined efflux pattern. While in all of the embodiments described herein each cascade element in a group may be interchanged in an array location with any other cascade element in the group, the cascade elements are also selectively interchangeable with any other cascade element in the group, wherein the cascade assembly still functions to substantially achieve the predefined efflux pattern.

In a first preferred embodiment, the predefined polygon is a regular polygon, and each cascade element is rotatable in its array position about an axis generally normal to the cascade element. Moreover, the array substantially approximates sections of at least two intersecting hollow spheres, wherein a central axis of the array is generally coincident with the longitudinal axis of the jet engine. In alternative embodiments, wherein rotatability of each cascade element is maintained within its array position, the array may substantially approximate: a section of a single hollow sphere; sections of three or more intersecting hollow spheres; a section of a single multi-faceted polyhedron; or sections of intersecting multi-faceted polyhedrons.

Other embodiments are provided wherein each cascade element is not necessarily rotatable within its array position. In embodiments where rotatability of the cascade elements is not necessary, the predefined polygon may be irregular and, in addition to the previously described shapes, the array may substantially approximate: a hollow cylinder, a cone, or a section of a multifaceted-shaped cone or tube. In the non-rotatable embodiments, there are two principle configurations. In the first configuration the array includes at least two rows of cascade elements. In the second configuration, the array may have a single row of cascade elements, but the cascade elements, which in all of the embodiments include a set of vanes, will have sets of vanes arranged in a limited number of different patterns.

In the first preferred embodiment, the cascade elements are supported in the cascade assembly by a truss structure forming part of the cascade assembly. The truss structure includes a framework defining openings in the shape of the predefined regular polygon, wherein the openings are adapted to receive and support the cascade elements. In a preferred embodiment, the surfaces of the truss structure are in the shape of spherical segments; however, alternatively, the surfaces of the truss structure may be planar.

Moreover, in another alternative embodiment, the cascade elements may be connectable directly to one another so that they support one another, and a truss structure is not required. In other embodiments wherein the cascade elements are not necessarily rotatable within an array position and the array includes at least two rows of cascade elements, the cascade elements are preferably supported by a circumferential strap positioned between adjacent rows, or by a truss structure, which may have surfaces that are cylindrical or conical segments in addition to surfaces that are planar or spherical segments.

Similarly, the cascade elements may be generally planar, or in the form of a spherical, cylindrical, or conical segment. In the first preferred embodiment, the cascade elements are substantially in the shape of an equilateral triangle. In alternative embodiments, the cascade elements may be in the shape of other polygons. Preferably, at least one side of each cascade element that defines the predefined polygon is faired for aerodynamic efficiency.

As previously mentioned, the cascade elements in all of the embodiments each contain a set of vanes. In the first preferred embodiment, there are two types of cascade elements, the first type having a set of vanes in a pattern different from the second type. Alternatively, there may be only one type of cascade element with a set of vanes in a single pattern, or there may be three or more types of cascade elements.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 5 is a perspective view of part of the cascade assembly from FIG. 3 removed from the turbo-fan engine;

FIG. 6 is a perspective view of a planar truss structure that may be used in a cascade assembly in accordance with the present invention;

DETAILED DESCRIPTION OF THE PREFERRED EMBODIMENT

A first preferred embodiment of the present invention provides a cascade assembly comprised of at least one group of substantially identically-shaped cascade elements, each in the shape of a predefined regular polygon. The cascade elements are cooperatively arranged in an array wherein each cascade element in the group may be interchanged in a location in the array with any other cascade element in the group. Additionally, each cascade element may be rotated within any position in the array about an axis generally normal to the cascade element. In the first preferred embodiment, the array substantially approximates adjacent sections of intersecting hollow spheres, wherein a central axis of the array is generally coincident with the longitudinal axis of the jet engine. A detailed description of the structure in the first preferred embodiment is first presented, followed by an explanation of why that structure was selected.

Figure 3:
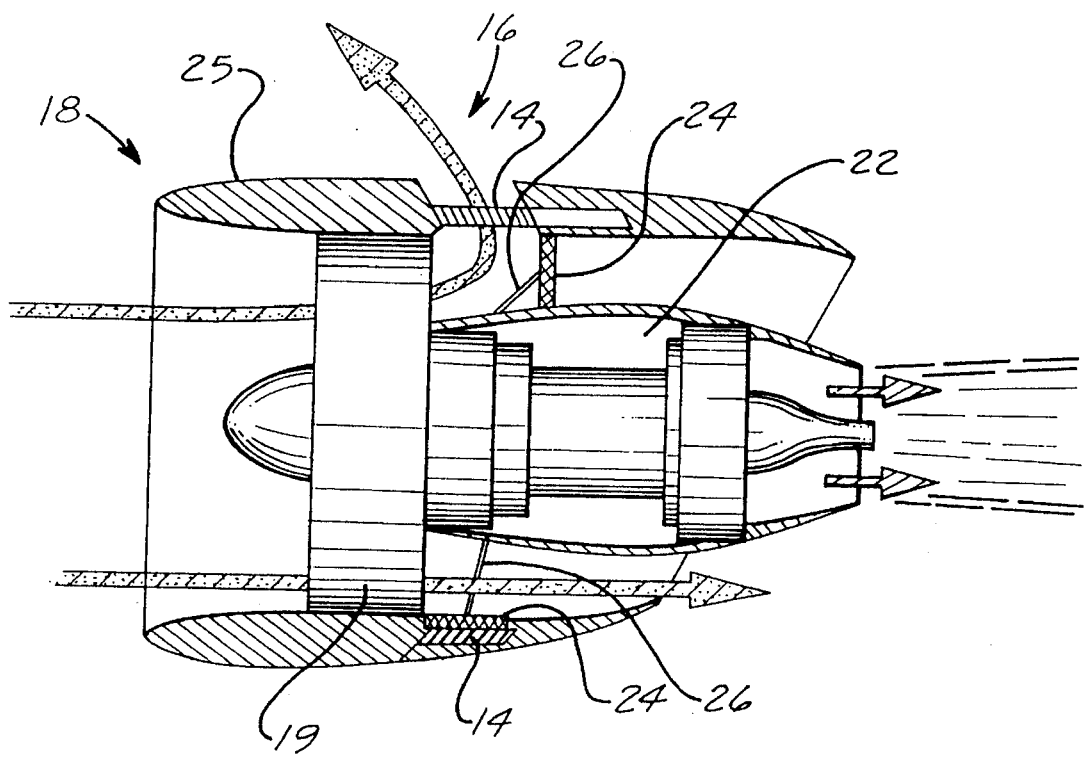
FIG. 3 is a partial, cross-sectional view of a turbo-fan engine, incorporating a cascade assembly in accordance with the present invention.

The first preferred embodiment of the current invention is shown in FIG. 3 as a cascade assembly 14, incorporated into a thrust reverser mechanism 16, on a turbo-fan engine 18. The upper half of the engine 18 is shown with the thrust reverser mechanism 16 in operation, and the lower half of the engine is shown with the thrust reverser in the stowed position. Therefore, in the lower half of the engine 18, the gases flow straight through the engine and exit at the rear. In both cases, the gas flowing through a fan 19 bypasses the turbine 22. However, in the upper half of the engine 18, which shows the thrust reverser 16 in operation, the gas flowing through fan 19 exits through cascade assembly 14.

The thrust reverser 16 is engaged by deploying a blocker door 24, actuated by a linkage 26, to block the normal flow of gas that bypasses the turbine 22. In the lower half of the engine 18, the blocker door 24 is shown in its stowed position. In the upper half of the engine 18, the blocker door 24 is deployed. Thus, the gas flow in the upper part of the engine 18 is redirected through the cascade assembly 14, mounted in a cavity in the engine nacelle 25. The redirected gas flows through the cascade assembly 14, composed of many individual vanes that direct the exiting gas forwardly, producing a reverse thrust.

Figure 4:
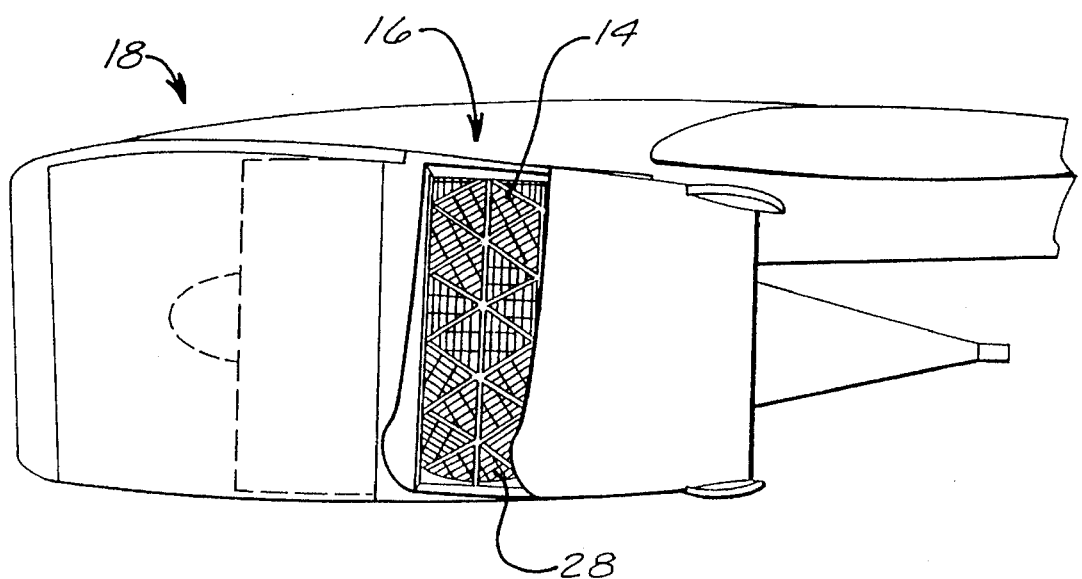
FIG. 4 is a view of the turbo-fan engine of FIG. 3 from the outside, with the cascade assembly of FIG. 3 exposed.

FIG. 4 is a view of the turbo-fan engine 18 from the outside of the engine with the thrust reverser mechanism 16 in operation. Thus, the cascade assembly 14 is exposed so that gases may pass from the interior of the engine 18 to the exterior of the engine through the cascade assembly 14. As the gases pass through the cascade assembly 14, they are directed forwardly, thus producing a reversing thrust.

As can be seen in the first preferred embodiment, the cascade assembly 14 is composed of a single group of many individual cascade elements 28 in the shape of regular polygons, and ideally in the shape of identically sized equilateral triangles. However, as will be discussed later, alternative embodiments may employ two or more groups of cascade elements 28, wherein in the first group the cascade elements are in the shape of a first predefined regular polygon, such as a hexagon, and in the second group the cascade elements are in the shape of a second predefined regular polygon, such as an equilateral triangle. Other alternative embodiments may employ cascade elements that are in the shape of a polygon that is not regular, such as a rectangle.

Figure 11:
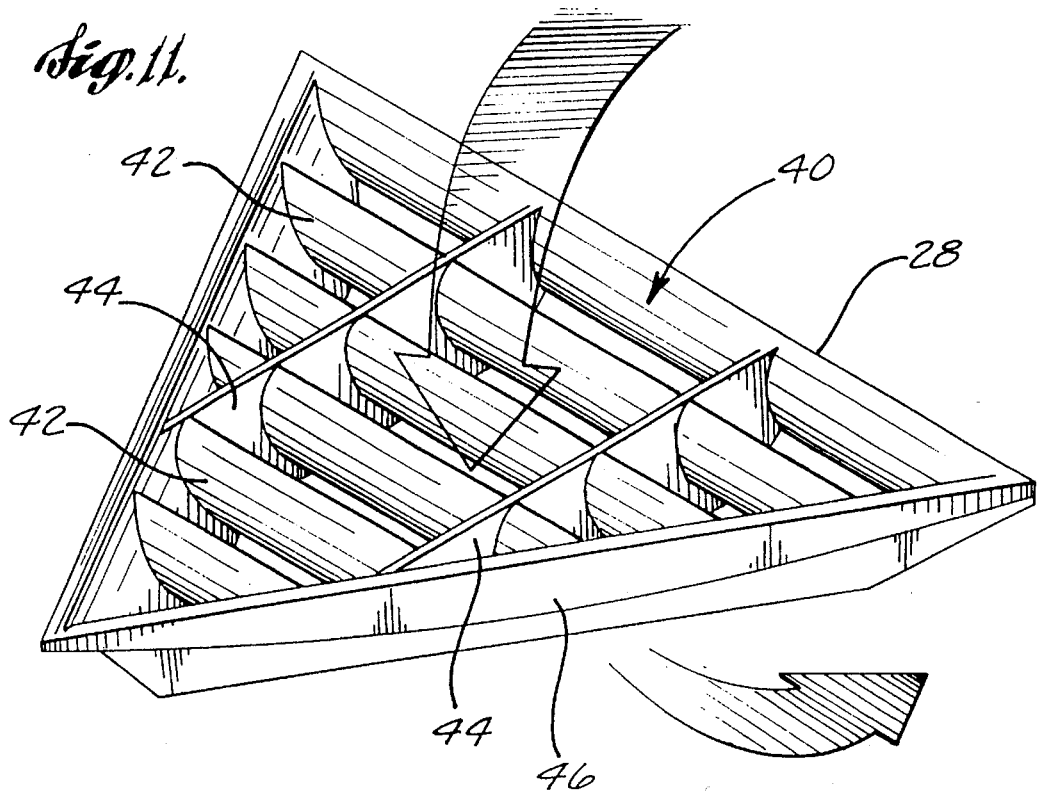
FIG. 11 is a perspective view of a planar cascade element in accordance with the present invention.

Returning to a discussion of the first preferred embodiment, an enlarged view of an individual cascade element 28 from the cascade assembly 14 is shown in FIG. 11. Ideally, each cascade element 28 in the cascade assembly 14 is substantially identical in shape, size, and construction to every other cascade element 28. The cascade elements 28 are arranged in an array to form the cascade assembly 14, which is mounted around the centerline of the engine 18, such that the array substantially approximates sections of intersecting hollow spheres, and such that the central axis of the array is generally coincident with the longitudinal axis of the engine. The cascade elements 28 in the array mesh together so that there are substantially no gaps between adjacent elements.

Part of the cascade assembly 14, removed from the engine 18, is illustrated in FIG. 5. As shown, individual cascade elements 28 are supported by a truss structure 30. The truss structure forms a framework defining openings 32a and 32b in the shape of the cascade elements 28, adapted to receive and support the cascade elements. Two cascade elements 28a and 28b are shown removed from the truss structure 30. The truss structure 30 itself substantially approximates adjacent sections of intersecting hollow spheres, wherein a central axis of the truss structure is generally coincident with the longitudinal axis of the engine 18. Thus, the truss structure 30 serves to hold the cascade elements 28 in place to complete the cascade assembly 14 in the shape of adjacent sections of two intersecting hollow spheres.

The reason that, in the first preferred embodiment, the cascade assembly 14 ideally forms an array that substantially approximates adjacent sections of two intersecting hollow spheres with a central axis of the array generally coincident with the longitudinal axis of the engine 18, is primarily twofold. One goal of the present invention was for each cascade element 28 to be able to occupy any position in the assembly 14 so that a multitude of different cascade elements is not required as in prior art cascade assemblies. This first goal was addressed by providing substantially identical cascade elements 28 in the shape of a predefined regular polygon. Thus, each cascade element 28 is substantially identical in shape and size to every other cascade element, and could be placed anywhere in the assembly.

A second goal of the present invention was to enable the cascade elements 28, when in place in the assembly 14, to direct the flow of gas, in combination with the other elements, in a predefined efflux pattern to avoid impingement upon the wing, fuselage, and flight control surfaces, and also to avoid reingestment by the engine. One way in which the second goal was addressed was by providing a cascade assembly 14, wherein each cascade element 28 could be rotated in position in the array about an axis generally normal to the cascade element to direct the gas flow in the desired pattern. As will be discussed later, an alternative embodiment is disclosed wherein the second goal is achieved without requiring that the cascade elements 28 be rotatable within an array position.

Figure 7:
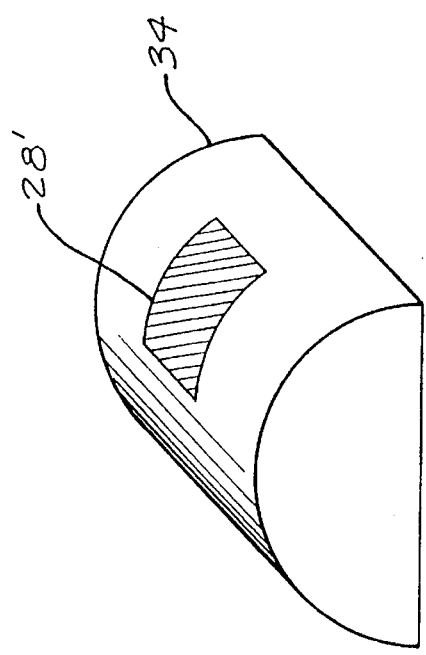
FIG. 7 is a perspective view of a portion of a hollow cylinder with a prior art cylindrical cascade element resting on the surface of the hollow cylinder.
Figure 8:
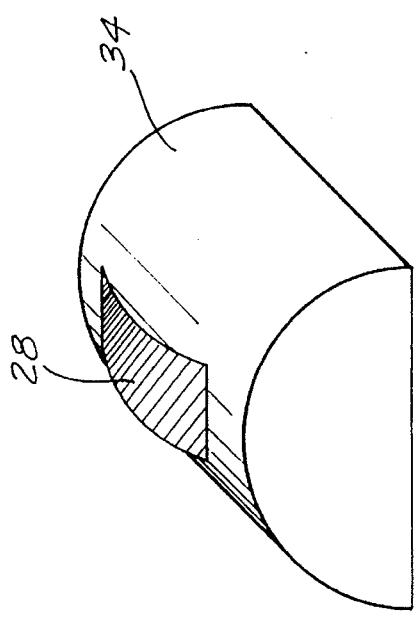
FIG. 8 is a perspective view of the hollow cylinder and cylindrical cascade element of FIG. 7, with the prior art cylindrical cascade element rotated 90° on the surface of the hollow cylinder.

A spherical interface surface enables each cascade element 28 to be rotated in each position in the array about an axis normal to the cascade element. However, a cylindrical interface surface, such as cylindrical surface 34, illustrated in FIGS. 7 and 8, will not. With the cylindrical interface 34 each cascade element 28' would have a curvature about the axis of rotation of the cylinder. Thus, the cascade element 28' could not be rotated to a position wherein the axis of curvature of the cascade element is not generally aligned with the axis of rotation of the cylinder 34, as shown in FIG. 8. Not shown, but readily apparent to those skilled in the art, is that an array in the shape of a cone would suffer from the same shortcoming as a cylindrical array of cascade elements. The cascade elements could not be rotated to positions wherein the axis of curvature of the cascade elements is not generally coincident with the axis of rotation of the cone.

However, if the array surface is spherical the above problem is avoided. Cascade elements forming the surface of the array may be rotated about an axis normal to the cascade element and still conform to the shape of the array surface. The reason is because a cascade element forming a segment of a sphere ideally has an infinite number of axes of curvature, and because a sphere ideally has an infinite number of axes of rotation. Therefore, when a cascade element forming a spherical section is rotated, the axis of curvature of the cascade element and the axis of rotation of the sphere are always generally coincident, unlike a cylinder or cone.

In accordance with the first preferred embodiment of the present invention, the surfaces of the truss structure 30 substantially approximate the shape of the sections of two intersecting spheres. As shown in FIG. 5, the first row 35a of cascade elements 28 in truss structure 30 form a surface substantially approximating a section 36a of the first sphere of the two intersecting spheres. The second row 35b of cascade elements in truss structure 30 forms a surface substantially approximating a section 36b of the second sphere. Each spherical section 36a, 36b has substantially the same radius, and has a central axis generally coincident about the longitudinal axis of the engine 18. Hence, cascade elements 28 in the first row 35a may be inserted into the second row 35b and vice versa. Moreover, as the interface surface is spherical, cascade elements 28 may be rotated about an axis generally normal to each cascade element when in position in the array.

Figure 13:
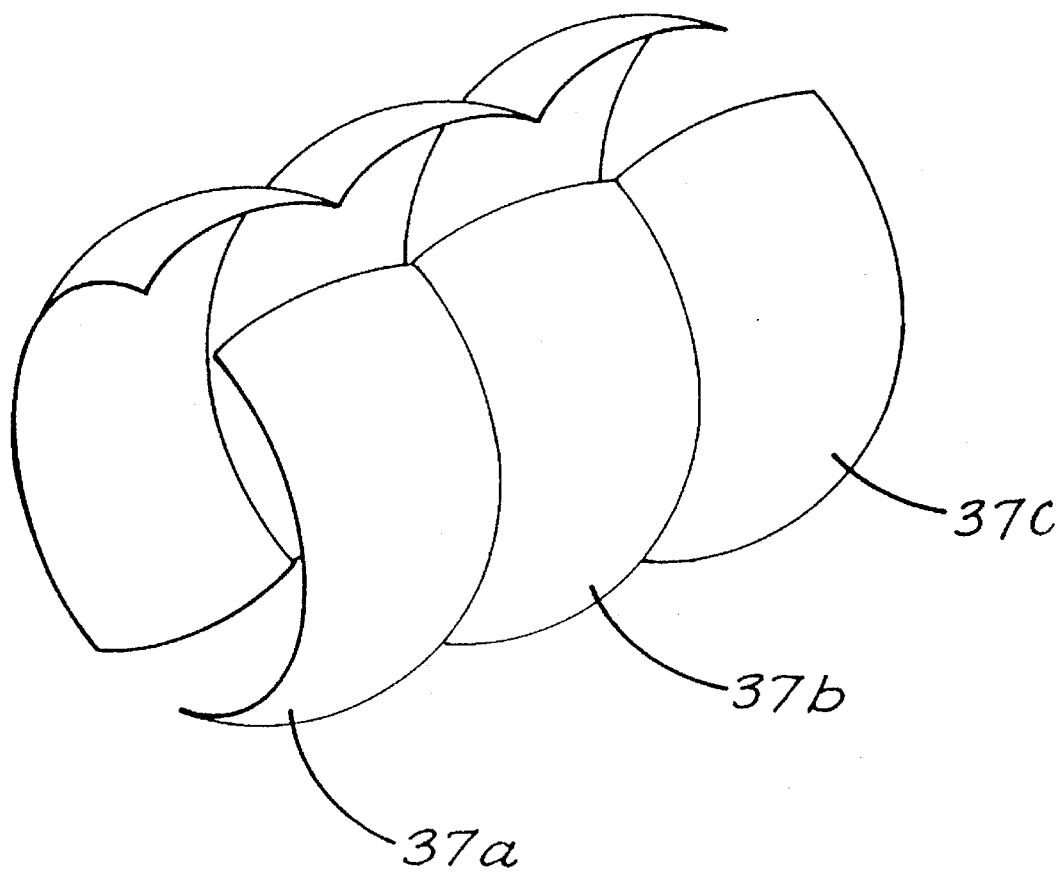
FIG. 13 is a diagram illustrating sections of three intersecting hollow spheres.

While in the first preferred embodiment of the present invention the array substantially approximates sections 36a, 36b of two intersecting hollow spheres, it will be readily appreciated by those skilled in the art that the array could substantially approximate sections 37a, 37b, 37c of three or more hollow intersecting spheres, as shown in FIG. 13, or a section of a single hollow sphere in alternative embodiments. In either of these alternative embodiments, the cascade elements 28 would be interchangeable in a location in the array with any other cascade element in the group, and would be rotatable about an axis normal to the cascade element. The reason that in the first preferred embodiment of the present invention the array substantially approximates sections 36a, 36b of two intersecting hollow spheres, rather than a single hollow sphere or a portion of three or more hollow spheres, is explained infra.

In another preferred embodiment of the present invention, wherein the array of cascade elements substantially approximates a section of a sphere or sections of intersecting spheres, the interface surfaces of the truss structure are planar, rather than curved, to coincide with the spherical shape(s) of the array. In FIG. 5 the openings 32a, 32b in which the cascade elements 28 are inserted are bordered by surfaces of the truss that cooperatively define a spherical shape. In contrast, in FIG. 6 a truss structure 38 is shown wherein the openings 32' are defined by surfaces of the truss that are planar, wherein the cascade elements 28 may be inserted into the openings 32' and are rotatable therein to different positions. The truss openings 32a, 32b in which the cascade elements 28 are inserted are bordered by structure 38 in FIG. 6 still substantially approximates sections 36a', 36b' of two intersecting hollow spheres, although by the use of planar surfaces.

Figure 12:
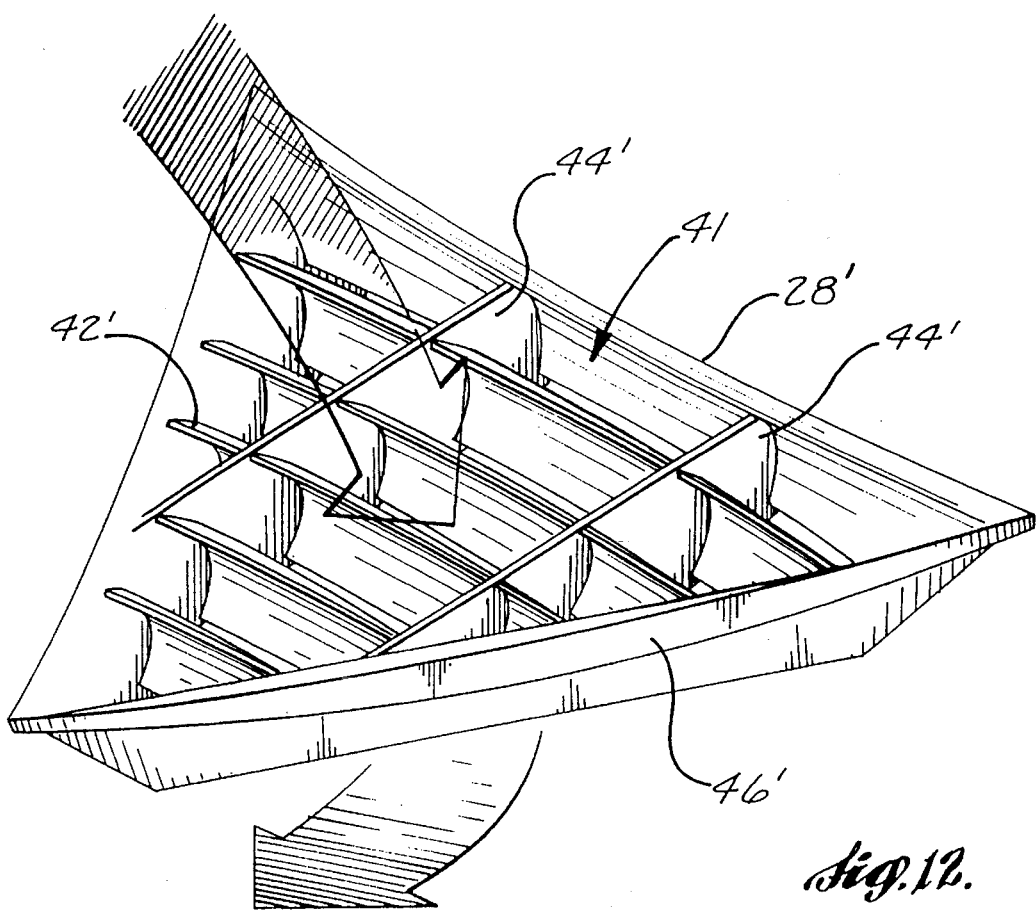
FIG. 12 is a perspective view of a cascade element forming a spherical segment in accordance with the present invention.

Similarly, the cascade elements 28 may be planar elements or spherical segments, as illustrated in FIG. 11 and FIG. 12, respectively. A portion of a hollow sphere, or of intersecting hollow spheres, can be more accurately approximated by employing sections that are spherical, as opposed to planar. However, spherical sections are more difficult to produce, and hence more expensive to produce. In the first preferred embodiment, a compromise position was selected. The surfaces of the truss 30 are spherical segments, but the cascade elements 28 are planar.

Generally, a sphere may be approximated by planar segments, spherical segments, or a combination thereof. Where only planar surfaces are used to approximate a sphere, the approximating shape can only ideally be a multi-faceted polyhedron. However, if the polyhedron has enough facets, a sphere is substantially approximated. Therefore, in alternative embodiments, a section of a hollow multifaceted polyhedron or sections of intersecting hollow multi-faceted polyhedrons are substantially approximated by the array.

In the first preferred embodiment, the cascade elements 28 each contain a plurality of parallel, uniformly or non-uniformly spaced vanes 42 and 42' in the patterns 40 and 41 shown in FIGS. 11 and 12. In FIG. 11, the vanes 42 of pattern 40 face concavely towards, and are parallel to, one leg composing the triangular cascade element 28, such that the exit gas, or efflux, from the cascade element is directed from the vertex of the triangle towards the leg opposite the vertex. In contrast, the vanes 42' in pattern 41 face concavely towards the vertex of the triangle, such that the exit gas flow is directed from one leg of the triangle to the opposite vertex. Extending in spaced parallel relationship to each other and perpendicular to the vanes 42, 42' are two thin struts 44, 44' that provide rigidity to the cascade elements 28 and 28'.

It should be mentioned here that although the first preferred embodiment employs cascade elements 28 that are substantially in the shape of a regular polygon that is in the form of a triangle, other embodiments are also possible. For example, virtually any regular polygon shape may be chosen for the cascade elements 28, such as squares or octagons. However, it is preferable that the polygon shape or combination of shapes chosen for the cascade elements 28 be able to nest tightly with adjacent cascade elements so that there are no large gaps between adjacent cascade elements. As such, substantially all of the surface area of the cascade assembly 14 is composed of functional cascade elements 28, rather than the truss structure 30 through which the gas cannot flow. For example, triangles, squares or hexagons nest closely together, but octagons do not. Thus, octagons would not be a preferable choice. Furthermore, in the first preferred embodiment there are only two patterns of vanes composing the cascade elements, as shown in FIGS. 11 and 12. However, alternative embodiments may be employed that include more, or fewer, patterns of vanes.

Returning to FIG. 5, two cascade elements 28a and 28b are shown removed from the truss structure 30. Both cascade elements 28a and 28b have the same vane pattern 40, that is, the flow of gas through these cascade elements will be directed from one vertex of the triangle towards the opposite leg. When the two cascade elements 28a and 28b are inserted into the cascade assembly 14, the exit flow of gas through these cascade elements corresponds to the direction of the solid arrows shown in the two openings 32a and 32b of the truss structure 30. As can be seen from FIG. 5, efflux of element 28a will be directed or skewed at an angle approximately 60° clockwise from the forward directed efflux of element 28b.

If the orientation of cascade element 28a is maintained, and cascade element 28b rotated into the two other orientations relative to cascade element 28a, the first such other orientation (clockwise from its original orientation) is a position wherein the flow of gas directed through the cascade element is at an angle approximately 30° clockwise to the gas flow directed through element 28a. In the second of other such orientations the gas flow is directed through elements 28a and 28b in substantially opposite directions.

Cascade element 28b may be replaced by a cascade element having vane pattern 41. If such a replacement is made, then the vane pattern 41 cascade element substituted into opening 32b can provide a forward efflux direction of either up or down as shown by the dashed arrows shown in opening 32b. Not generally desired but sometimes of use in special cases, the same vane pattern 41 cascade element could be positioned in opening 32b to provide either upward or downward rearward efflux vectors. These vectors would be opposite to the dashed arrows shown in opening 32b.

Similarly, the vane pattern 40 cascade element shown for opening 32a in FIG. 5 could be positioned as to parallel any one of the four orientations described for opening 32b. Substitution of a vane pattern 41 cascade element into opening 32a yields a forward facing efflux direction as shown by the dashed arrow of opening 32a.

As can be seen by different combinations and orientations of the two vane patterns with the cascade openings, efflux can be directed in any one of the six evenly spaced directions with those of primary interest being forward, 60° clockwise from forward, and 60° counterclockwise from forward.

The desired overall efflux pattern is achieved by arranging the vane pattern 40 and vane pattern 41 cascade elements 28 in openings 32a and 32b such that the combination of the resulting cascade efflux flows through each cascade element forms the overall efflux pattern. The significantly large number of permutations available for a given design is expressed by the following equation:

$$P = C_o^N \tag{1}$$

where P is the possible number of overall efflux patterns, $C_o$ is the number of orientations possible in each opening 32 in the array, and N is the number of openings 32 in the array. In a first preferred embodiment of triangular cascades containing 48 openings per engine (N=48), each opening can have six different efflux directions ($C_o$=6). The number of possible arrangements, P, is approximately $2.25 \times 10^{37}$. However, it will be readily apparent to those skilled in the art that many configurations can be rejected without serious consideration because they involve orientations of a cascade element 28 that direct the gas flow rearwardly, rather than forwardly.

If only the forward facing efflux directions are considered, only three orientations are possible in each position (N=3) and the number of overall arrangements, P, is approximately $8 \times 10^{22}$.

Figure 1:
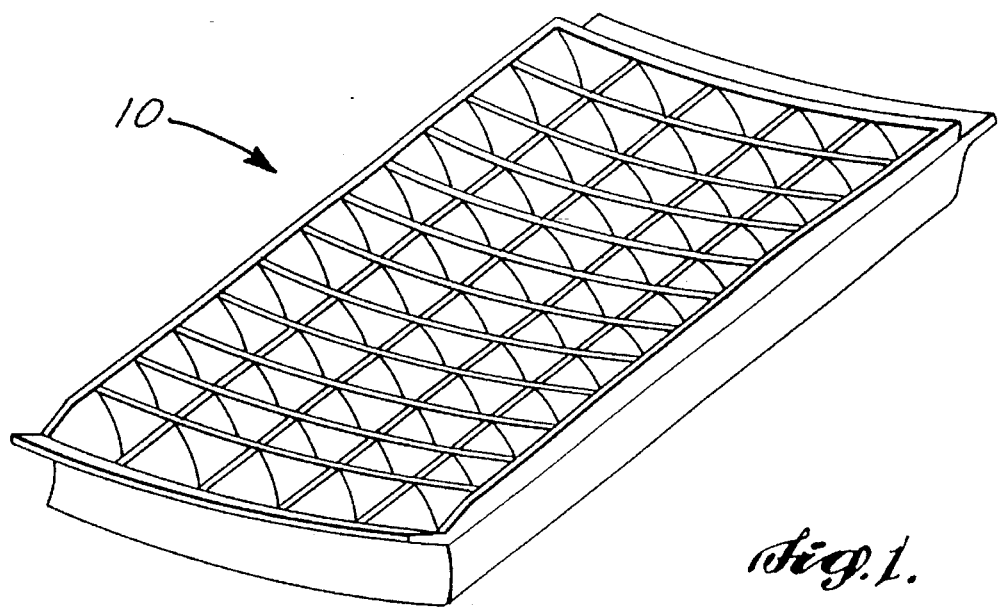
FIG. 1 is a perspective view of a prior art cascade element.
Figure 2:
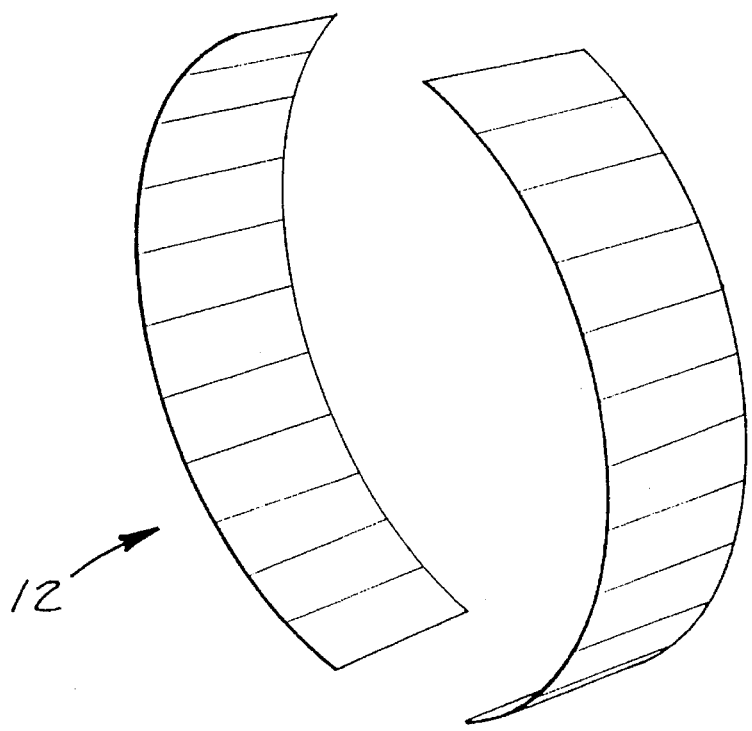
FIG. 2 is a representation of a prior art cascade assembly.

Prior art cascade assemblies, as shown in FIG. 2, typically use 16 different cascade elements in contrast to the first preferred embodiment of the present invention, which ideally uses at least 48 cascade elements to direct the same gas flow. Thus, each cascade element 28 of the present invention directs a much smaller gas flow in contrast to prior art cascade elements, permitting more precise adjustments to the overall pattern of forwardly directed gas through the cascade assembly 14. This more precise control permits the current invention to achieve a desired pattern of forwardly directed gas that is virtually as aerodynamically efficient as that produced by prior art assemblies, while achieving a substantial savings in production costs.

Turning to FIG. 5 again, the cascade elements 28 are preferably mounted on the truss structure 30 from the concave side of the truss. Thus, radial gas flow loads on the cascade elements 28 from the engine 18 serve to seat the cascade elements into the truss structure 30 and distribute such loads about the entire perimeter of the cascade elements, rather than concentrating such loads at retention fasteners. As a result, the maximum stress imposed on a cascade element is sufficiently reduced to allow the use of injection-molded plastic to form cascade elements. This reduces the production cost of the cascade elements 28 compared to the cost of manufacturing the cascade elements from high strength materials such as metals. Nonetheless, it will be readily appreciated by those skilled in the art that the cascade elements 28 could be mounted in truss 30 from the convex side of the truss with use of fasteners, clamps, adhesives, or other methods to withstand applied radial air loads.

Referring to FIGS. 11 and 12 again, each cascade element 28, 28' has a shoulder 46 extending around its perimeter that flares out along the periphery of the cascade element adjacent to the engine 18. The purpose of the shoulder portion 46 is twofold. First, it provides a supporting surface on the cascade element 28 for the truss structure 30 to bear against. In other words, the cascade elements 28 and 28' shown in FIGS. 11 and 12 are inserted into the openings 32 of the truss structure 30 so that the shoulder 46 faces inwards towards the longitudinal axis of the engine 18. Thus, radial air loads attempt to push the cascade elements 28 into the truss structure 30, but are prevented from doing so by the shoulder 46 bearing against the truss structure.

Second, the shoulder portions 46 provide fairing to make the cascade assembly 14 more aerodynamically efficient. When the cascade elements 28 are inserted into the openings 32 of the truss structure 30, shoulder portions 46 from adjacent cascade elements 28 snugly contact one another, providing a substantially smooth, aerodynamic surface facing the radial air flow from the engine 18. In an alternative embodiment, not shown, the cascade elements 28 may be fastened to the truss structure 30 by clamps (not shown) positioned between adjacent cascade elements to hold the shoulder portions 46 of the cascade elements to the truss.

Ideally, the aerodynamic surface at the vertices of the cascade elements 28 is incorporated into the retention clamp.

While in the first preferred embodiment the cascade elements 28 are supported by a truss structure 30, it will be readily appreciated by those skilled in the art that cascade elements 28 may be manufactured so that the cascade elements are connectable to each other to form the assembly 14, so that the truss structure 30 is not necessary. However, this is not the first preferred embodiment because such cascade elements 28 will require greater structural strength to support one another, and to withstand significantly greater bending loads in such an arrangement.

Figure 9:
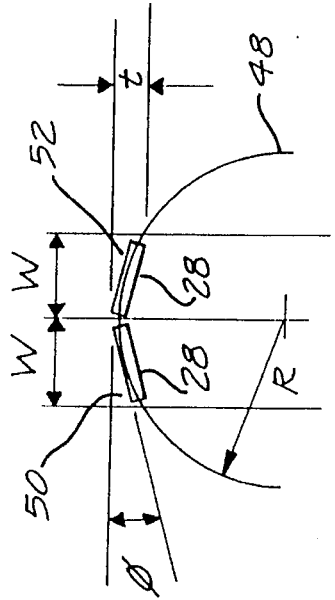
FIG. 9 is a diagram illustrating the approximate minimum thickness required for a cascade assembly in accordance with the present invention, wherein the array forming the cascade assembly substantially approximates a section of a single hollow sphere.

In the first preferred embodiment of the present invention, the array forming the cascade assembly 14 substantially approximates intersecting sections 36a, 36b of two hollow spheres. The reason for this arrangement is that the resulting cascade assembly 14 may be made thinner. Referring to FIG. 9, a partial cross section of a hollow sphere 48 is illustrated, with a radius R, measured from the longitudinal axis of the engine 18. At the top of the sphere a partial cross section of a cascade assembly is represented, wherein the cascade assembly includes two rows 50 and 52 of cascade elements 28. The array forming the cascade assembly substantially approximates a section of a single hollow sphere 48. Each row 50 and 52 substantially approximates a portion of the hollow sphere 48, and has a width of approximately W, as shown. The resulting thickness of the cascade element is designated as t.

Figure 10:
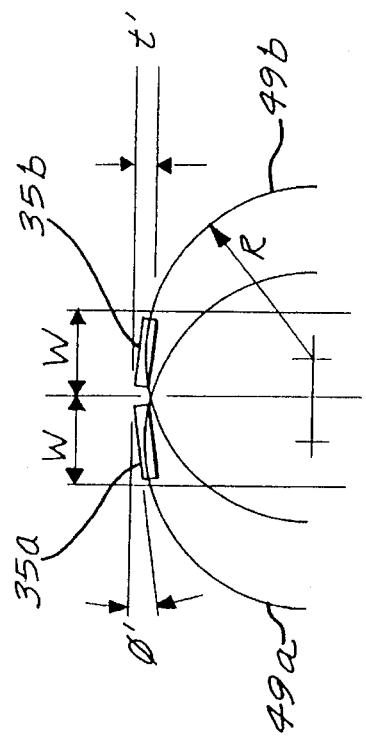
FIG. 10 is a diagram illustrating the approximate minimum thickness required for a cascade assembly in accordance with the present invention, wherein the array forming the cascade assembly substantially approximates adjacent sections of intersecting hollow spheres.

In contrast, FIG. 10 represents a partial cross section of cascade assembly 14 composed of an array that substantially approximates sections of two intersecting hollow spheres 49a and 49b, wherein each row 35a and 35b of cascade elements has essentially the same width W as rows 50 and 52, and the spheres 49a and 49b have the same radius R as sphere 48 in FIG. 9. The thickness of the array is designated as t' as illustrated in FIG. 10. As can be seen, the thickness t' is significantly less than t, allowing the thinner cascade assembly 14 to take up less space in an engine nacelle. Furthermore, when the thickness of the cascade assembly 14 is reduced, the tipping angle, $\phi$, between adjacent rows of cascade elements in the assembly is also reduced as illustrated in FIGS. 9 and 10. The reduced tipping angle reduces the correction necessary to apply to the vane arrays 40 and 41 to ensure that the flowing gases are directed to achieve maximum thrust reversal.

It will be readily appreciated, however, by those skilled in the art that the array in the cascade assembly 14 preferably only substantially approximates sections 36a, 36b of intersecting hollow spheres 49a and 49b when the cascade assembly includes at least two rows of cascade elements 28. For example, cascade elements 28a and 28b both are in the row 35b of cascade elements 28 that substantially approximate section 36b of sphere 49b in FIGS. 5 and 10. If the cascade assembly 14 is composed of a single row 35b of cascade elements 28, then the array of cascade elements would substantially approximate a section of a single sphere, for example sphere 49b in FIG. 10, rather than sections of two intersecting spheres.

For any given set of design requirements, cascade array designs can be generated requiring at least two rows of cascade elements 28. In preferred embodiments requiring triangular-shaped cascade elements 28, as rows of cascade elements are added the size of the cascade elements is reduced.

Generally, in the first preferred embodiment, each row 35a or 35b of cascade elements 28 substantially approximates a section from a different sphere. For example, in FIG. 5, row 35a of cascade elements 28 substantially approximates section 36a of sphere 49a in FIG. 10. Similarly, row 35b of cascade elements 28 substantially approximates section 36b of sphere 49b from FIG. 10. If a third row of cascade elements 28 were required to accommodate the gas flow from engine 18, this row would substantially approximate a section from a third sphere, and so on.

Nonetheless, it will be readily appreciated by those skilled in the art that alternative embodiments may depart from the above. That is, in alternative embodiments each row 35a or 35b of cascade elements 28 is not necessarily required to substantially approximate a section from a different sphere. For example, cascade assemblies 14 composed of more than one row 35a or 35b of cascade elements 28 may substantially approximate a section from a single hollow sphere. However, the resulting cascade assemblies 14 will be thicker, that is on the order of t rather than t' as illustrated in FIGS. 9 and 10, and will not have the other advantages described above, as in the first preferred embodiment.

Figure 14:
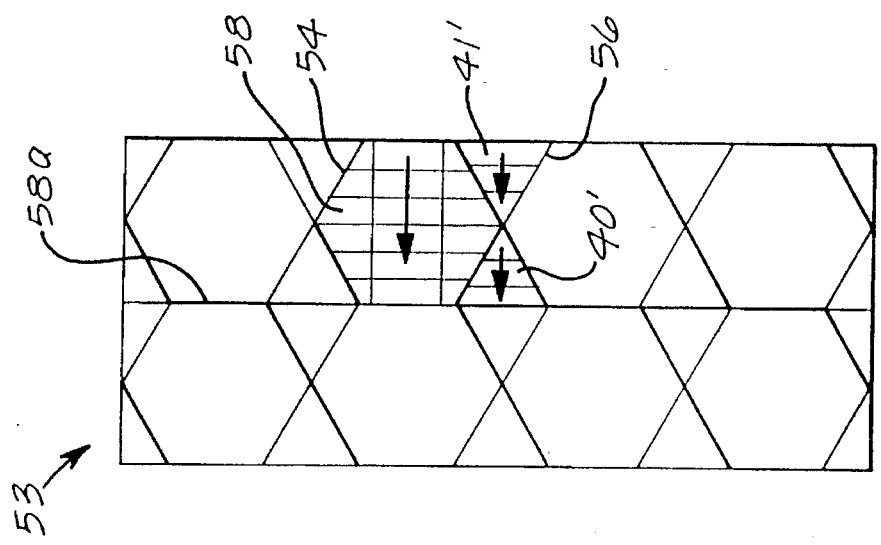
FIG. 14 is an illustration of a generally spherical cascade assembly employing two groups of cascade elements in accordance with the present invention as an alternative to a first preferred embodiment.
Figure 17:
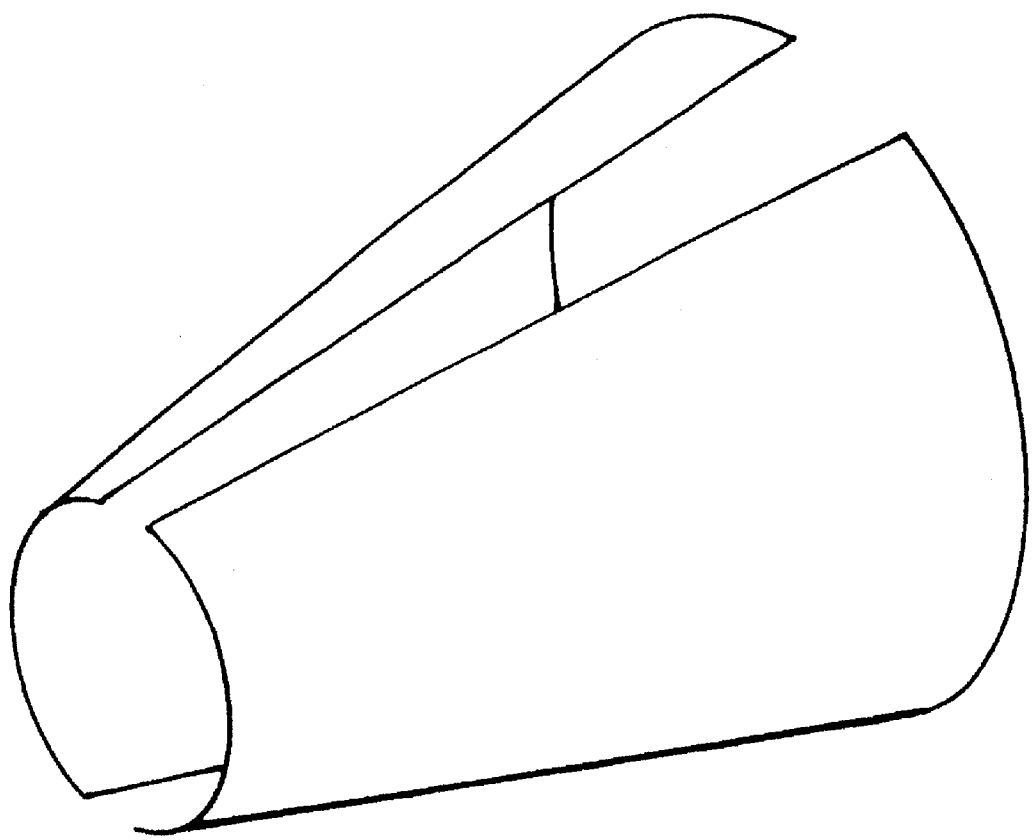
FIG. 17 is a representation of a general conical cascade assembly in accordance with the present invention as an alternative to a first preferred embodiment.

A representation of an alternative cascade assembly 53 in accordance with the present invention is shown in FIG. 14. In cascade assembly 53, the array preferably still substantially approximates at least one section of a hollow sphere, but two groups of cascade elements 54 and 56 are employed. The first group of cascade elements 54 are in the shape of a predefined regular polygon that is hexagon. The second group of cascade elements 56 are in the shape of a predefined regular polygon that may be identical to cascade elements 28 or 28', best seen in FIGS. 11 and 12, which are in the shape of an equilateral triangle. As cascade elements 54 and 56 are generally in the shape of regular polygons, the cascade elements are still rotatable about an axis generally normal to each cascade element.

Once again, as in the preferred embodiment discussed above, the cascade elements 56 that are in the shape of an equilateral triangle ideally have one or two different vane patterns 40' or 41'. Vane pattern 40' directs the efflux from a vertex of the triangle towards the opposite leg, while vane pattern 41' directs the efflux from a leg of the triangle to the opposite vertex. Cascade elements 54 have a single vane pattern 58 that directs the efflux from one side of the hexagon towards the opposite side. As in the first preferred embodiment, the overall efflux pattern is achieved by arranging cascade elements 56 with vane patterns 40' or 41' and cascade element 58 in an array such that the combination of the resulting efflux flowing through each cascade element 54 or 56 forms the overall efflux pattern. Also, as in the first preferred embodiment, the cascade elements 54 and 56 are rotatable within an array positioned about an axis generally normal to the cascade element, so that a great number of permutations is available to achieve the desired efflux pattern.

Also, it should be recognized that while cascade assembly 53 employs two groups of cascade elements 54 and 56, other alternative embodiments could employ three or more groups of cascade elements. Furthermore, other embodiments may employ cascade elements that are in the shapes of regular polygons other than equilateral triangles and hexagons, such as squares and octagons. However, as previously noted, octagons are not preferred because they do not nest closely together.

Figure 15:
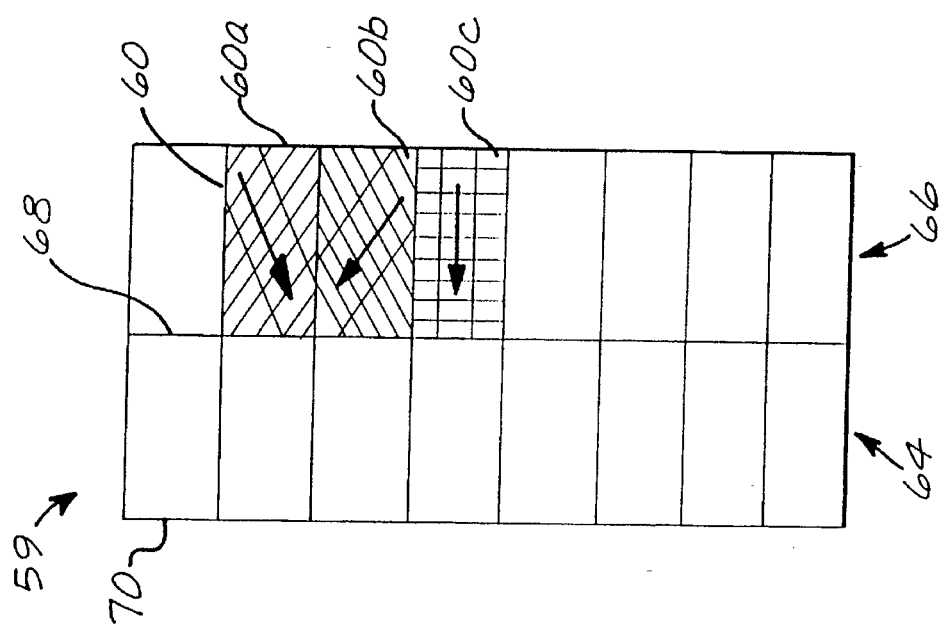
FIG. 15 is a representation of a generally cylindrical cascade assembly employing two rows of cascade elements with a circumferential strap in accordance with the present invention as an alternative to a first preferred embodiment.

An additional alternative cascade assembly 59 in accordance with the present invention is represented in FIG. 15. In this embodiment, the cascade elements 60 are not required to be rotatable about an axis generally normal to the cascade elements. Thus, the array is not required to substantially approximate a sphere, although it may. In alternative cascade assembly 59, it is envisioned that the array will substantially approximate a hollow cylinder, or a section of a hollow cone, wherein the array has a central axis generally coincident with the longitudinal axis of the jet engine 18. However, the array may approximate other shapes as well, such as a multifaceted-shaped section of a cone or tube. Also, because the cascade elements 60 are not required to be rotatable, the cascade elements may be in the shape of an irregular polygon, which in alternative cascade assembly 59 are rectangles.

Cascade assembly 59 employs cascade elements 60 with three different vane patterns 60a, 60b, and 60c. A cascade element 60 with vane pattern 60c directs efflux through the cascade element in a direction generally parallel with the longitudinal axis of the rectangular cascade element. In contrast, cascade element 60 with vane pattern 60b directs the efflux upwardly, relative to the page, more or less along a diagonal of the rectangular cascade element, while on the other hand, vane pattern 60a directs the efflux downwardly, again relative to the page, more or less along the other diagonal of the rectangular cascade element.

As in the first preferred embodiment, the cascade elements 60 with vane patterns 60a, 60b or 60c are arranged such that the combination of the resulting efflux flows through each cascade element forming the overall efflux pattern. However, as the cascade elements 60 are in the shape of a rectangle, and the array is not required to approximate a sphere, the cascade elements are not rotatable within an array position. Hence, for a given number of cascade elements 60 in cascade assembly 59, there are not as many permutations of array positions relative to the number of permutations of array positions in cascade assembly 14 of the first preferred embodiment, which is a disadvantage.

Cascade assembly 59 may be divided into two or more rows 64 and 66 of cascade elements 60. In addition, adjacent rows 64 and 66 of cascade elements 60 may be supported by a circumferential strap 68 positioned between the rows of cascade elements. Dividing cascade assembly 59 into two or more rows 64 and 66, and supporting the cascade elements 60 by a strap 68 has two advantages. First, the circumferential strap effectively doubles the number of array locations and reduces the size of each cascade element 60. Therefore, the cascade elements 60 may be arranged in a greater number of permutations and combinations to more precisely achieve a desired overall efflux pattern.

Second, the required length of each cascade element 60 is reduced, which in turn reduces the bending loads carried by the cascade element. The bending loads that would be normally carried by the cascade elements 60 are redistributed as circumferential tension loads carried by the strap 68, which permits the cascade elements to be produced from lower strength and thus lower cost materials. Alternatively, multiple rows of cascade elements 60 may be supported by truss structure 70, similar to truss structures 30 or 38 in the first preferred embodiment, which will also permit the cascade elements 60 to be produced from lower strength materials.

Figure 16:
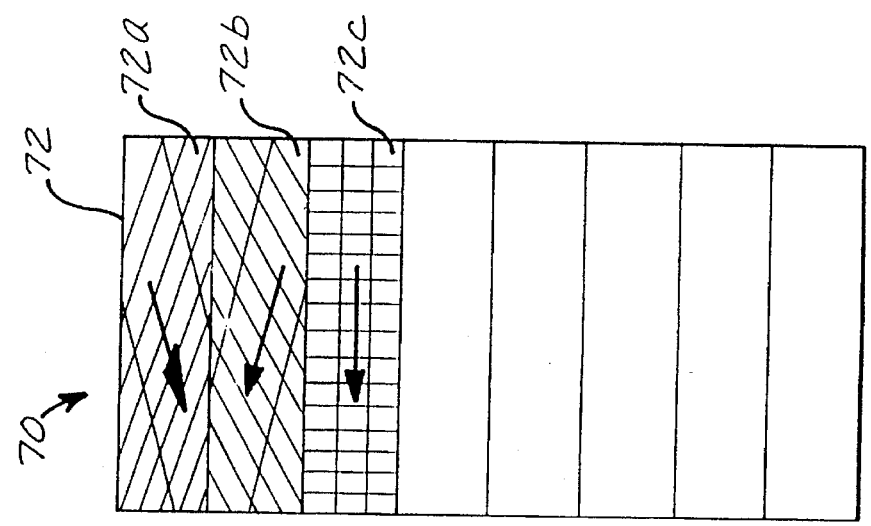
FIG. 16 is a representation of a generally cylindrical cascade assembly employing a single row of cascade elements in accordance with the present invention as an alternative to a first preferred embodiment.

FIG. 16 is a further representative alternative embodiment of a cascade assembly 70. Cascade assembly 70 is substantially identical to cascade assembly 59 except that cascade assembly 70 is not divided up into two or more rows of cascade elements 72. Therefore, cascade elements 72 are longer relative to cascade elements 60. As in cascade elements 60, the vanes of cascade elements 72 may be arranged in one of three different patterns, 72a, 72b, or 72c as shown.

Once again, as cascade elements 72 are not rotatable within an array location, for a given number of cascade elements 60 in cascade assembly 70, there are not as many permutations of array positions relative to the number of permutations of array positions in cascade assembly 14 of the first preferred embodiment.

A way to increase the number of permutations of array positions possible in cascade assemblies 59 or 70 is to reduce the width of the cascade elements 60 or 72, while maintaining their lengths constant. Thus, a greater number of cascade elements 60 or 72 would be required to complete the cascade assembly 59 or 70, hence, increasing the number of permutations available to substantially achieve a desired efflux pattern.

While preferred embodiments of the invention have been illustrated and described, it will be appreciated that various changes can be made therein without departing from the spirit and scope of the invention.

The embodiments of the invention in which an exclusive property or privilege is claimed are defined as follows:

1. A cascade assembly for use in a thrust-reversing mechanism of a jet engine, comprising at least one group of substantially identically-shaped cascade elements, each cascade element in the group having an outer periphery approximating the shape of a predefined polygon, and each cascade element including a plurality of vanes, the cascade elements being positioned in an array, wherein each cascade element in the group may be interchanged in a location in the array with any other cascade element in the group, and wherein the array comprises at least two circumferentially extending rows of cascade elements, one row positioned longitudinally aft of another row, wherein the cascade elements in the group comprise two different types, a first type having the plurality of vanes arranged in a first pattern and a second type having the plurality of vanes arranged in a second pattern.

2. The apparatus as in claim 1, wherein all of the cascade elements in the group are substantially the same size.

3. The apparatus as in claim 1, comprising a single group of substantially identically-shaped cascade elements.

4. The apparatus as in claim 1, wherein a circumferential strap is positioned between two adjacent rows of cascade elements to support the cascade elements.

5. The apparatus as in claim 1, wherein the cascade elements are supported by a truss structure defining a plurality of openings in the shape of the predefined polygon, adapted to receive and support the cascade elements.

6. The apparatus as in claim 1, comprising at least twin groups of substantially identically-shaped cascade elements.

7. The apparatus as in claim 1, wherein the cascade elements are each in the form of a segment of cylinder.

8. The apparatus as in claim 1, wherein the cascade elements are each in the form of a segment of a cone.

9. The apparatus as in claim 1, wherein the cascade elements are each generally planar.

10. The apparatus as in claim 1, wherein the array substantially approximates a section of a hollow cylinder, wherein a central axis of the array is generally coincident with the longitudinal axis of the jet engine.

11. The apparatus as in claim 10, wherein the array substantially approximates the section of the hollow cylinder by a plurality of adjacent planar surfaces of the array.

12. The apparatus as in claim 10, wherein the array substantially approximates the section of the hollow cylinder by a plurality of adjacent cylindrical segments of the array.

13. The apparatus as in claim 10, wherein the array substantially approximates the section of the hollow cylinder by a plurality of cylindrical segments of the array in combination with a plurality of planar surfaces of the array.

14. The apparatus as in claim 1, wherein the array substantially approximates a section of a hollow cone, wherein a central axis of the array is generally coincident with the longitudinal axis of the jet engine.

15. The apparatus as in claim 14, wherein the array substantially approximates the section of the hollow cone by a plurality of adjacent planar surfaces of the array.

16. The apparatus as in claim 14, wherein the array substantially approximates the section of the hollow cone by a plurality of adjacent conical segments of the array.

17. The apparatus as in claim 14, wherein the array substantially approximates the section of the hollow cone by a plurality of planar surfaces of the array in combination with a plurality of conical segments of the array.

18. A cascade assembly for use in a thrust-reversing mechanism of a jet engine, comprising at least one group of cascade elements, each cascade element in the group having an outer periphery approximating the shape of an equilateral triangle, and each cascade element including a plurality of vanes.

19. The apparatus as in claim 18, wherein all of the cascade elements in the group are substantially the same size.

20. The apparatus as in claim 18, wherein the cascade elements are positioned in an array, which substantially approximates sections of at least two non-coextensive, intersecting hollow spheres, wherein a central axis of the array is generally coincident with the longitudinal axis of the jet engine.

21. The apparatus as in claim 18, wherein each cascade element is comprised of two sides, a first side facing the jet engine, and a second side facing away from the jet engine, wherein at least one side of each cascade element is faired to form at least one generally aerodynamic surface on the cascade element.

22. The apparatus as in claim 18, wherein the cascade elements are each generally planar.

23. The apparatus as in claim 18, wherein the cascade elements are each in the form of a segment of a sphere.

24. The apparatus as in claim 18, wherein the cascade elements are positioned in an array, which substantially approximates sections of at least two non-coextensive, intersecting hollow multi-faceted polyhedrons, wherein a central axis of the array is generally coincident with the longitudinal axis of the jet engine.

25. The apparatus as in claim 18, wherein the cascade elements are positioned in an array, which substantially approximates at least one section of a hollow, multi-faceted polyhedron, wherein a central axis of the array is generally coincident with the longitudinal axis of the jet engine.

26. The apparatus as in claim 25, wherein the cascade elements are supported by a truss structure forming part of the cascade assembly.

27. The apparatus as in claim 25, wherein each cascade element is comprised of two sides, a first side facing the jet engine and a second side facing away from the jet engine, wherein at least one side of each cascade element is faired to form at least one generally aerodynamic surface on the cascade element.

28. The apparatus as in claim 25, wherein all of the cascade elements are substantially the same size.

29. The apparatus as in claim 18, wherein the cascade elements are positioned in an array, which substantially approximates at least one section of a hollow sphere, wherein a central axis of the array is generally coincident with the longitudinal axis of the jet engine.

30. The apparatus as in claim 29, wherein the array substantially approximates the section of the hollow sphere by a plurality of adjacent planar surfaces of the array.

31. The apparatus as in claim 29, wherein the array substantially approximates the section of the hollow sphere by a plurality of adjacent spherical segments of the array.

32. The apparatus as in claim 29, wherein the array substantially approximates the section of the hollow sphere by a plurality of planar surfaces of the array in combination with a plurality of spherical segments of the array.

33. The apparatus as in claim 29, wherein the cascade elements are supported by a truss structure forming part of the cascade assembly.

34. The apparatus as in claim 33, wherein the truss structure comprises a framework defining a plurality of openings in the shape of the the triangles, wherein the openings are adapted to receive and support the cascade elements.

35. The apparatus as in claim 34, wherein the surfaces of the truss structure bordering the openings are planar.

36. The apparatus as in claim 34, wherein the surfaces of the truss structure bordering the openings are in the shape of spherical segments.

37. A cascade assembly for use in a thrust-reversing mechanism of a jet engine, comprising at least one group of cascade elements, each cascade element in the group having an outer periphery approximating the shape of a triangle, and each cascade element including a plurality of vanes, the cascade elements being positioned in an array, which substantially approximates sections of at least two intersecting hollow multi-faceted polyhedrons, the array having a central axis generally coincident with the longitudinal axis of the jet engine, the cascade elements being supported by a truss structure forming part of the cascade element, wherein the truss structure comprises a framework defining a plurality of openings in the shape of the triangles, wherein the openings are adapted to receive and support the cascade elements.

38. The apparatus as in claim 37, wherein the surfaces of the truss structure bordering the openings are planar.

39. The apparatus as in claim 37, wherein the surfaces of the truss structure bordering the openings are in the shape of spherical segments.

40. A cascade assembly for use in a thrust-reversing mechanism of a jet engine, comprising at least one group of cascade elements, each cascade element in the group having an outer periphery approximating the shape of a triangle, and each cascade element including a plurality of vanes, the cascade elements being positioned in an array, which substantially approximates sections of at least two intersecting hollow multi-faceted polyhedrons, the array having a central axis generally coincident with the longitudinal axis of the jet engine, wherein the cascade elements in the group comprise two different types, a first type having the plurality of vanes arranged in a first pattern and a second type having the plurality of vanes arranged in a second pattern.

41. A cascade assembly for use in a thrust-reversing mechanism of a jet engine, comprising at least one group of cascade elements, each cascade element having an outer periphery approximating a predefined regular polygon, and each cascade element having a plurality of vanes, the cascade elements in the group being of two different types, a first type having a set of vanes arranged in a first pattern and a second type having a set of vanes arranged in a second pattern.

* * * * *

UNITED STATES PATENT AND TRADEMARK OFFICE
CERTIFICATE OF CORRECTION

PATENT NO. :  5,507,143
DATED      :  April 16, 1996
INVENTOR(S) :  C.A. Luttgeharm et al.

It is certified that error appears in the above-indentified patent and that said Letters Patent is hereby corrected as shown below:

COLUMN     LINE

13             48          "twin" should read --two--

Signed and Sealed this

Thirty-first Day of December, 1996

Attest:

BRUCE LEHMAN

*Attesting Officer*        *Commissioner of Patents and Trademarks*